United States Patent
Chin et al.

(10) Patent No.: US 7,999,740 B2
(45) Date of Patent: Aug. 16, 2011

(54) METHODS AND SYSTEMS FOR FAST RANGING IN WIRELESS COMMUNICATION NETWORKS

(75) Inventors: Tom Chin, San Diego, CA (US);
Kuo-Chun Lee, San Diego, CA (US);
Steven Cheng, San Diego, CA (US);
Ayman Fawzy Naguib, Cupertino, CA (US)

(73) Assignee: Qualcomm Incorporated, San Diego, CA (US)

( * ) Notice: Subject to any disclaimer, the term of this patent is extended or adjusted under 35 U.S.C. 154(b) by 274 days.

(21) Appl. No.: 12/211,946

(22) Filed: Sep. 17, 2008

(65) Prior Publication Data
US 2009/0315779 A1 Dec. 24, 2009

Related U.S. Application Data

(60) Provisional application No. 61/074,537, filed on Jun. 20, 2008.

(51) Int. Cl.
*G01S 3/02* (2006.01)

(52) U.S. Cl. .......................................... 342/458; 342/463
(58) Field of Classification Search .................. 342/458, 342/463–465; 455/422.1, 428, 432.1
See application file for complete search history.

(56) References Cited

U.S. PATENT DOCUMENTS

| | | | |
|---|---|---|---|
| 2005/0041573 A1* | 2/2005 | Eom et al. | 370/208 |
| 2007/0032255 A1* | 2/2007 | Koo et al. | 455/512 |
| 2009/0274041 A1* | 11/2009 | Chou et al. | 370/216 |

* cited by examiner

*Primary Examiner* — Dao L Phan
(74) *Attorney, Agent, or Firm* — Milan I. Patel

(57) ABSTRACT

A method for efficiently performing ranging in a wireless communication network may be implemented by a mobile station. The method may include sending a ranging code to a base station. The method may also include receiving a ranging response message from the base station. The method may also include determining whether a ranging failure condition is satisfied. The ranging failure condition may relate to something other than a duration of time. The method may further include re-sending the ranging code to the base station if the ranging failure condition is satisfied.

26 Claims, 10 Drawing Sheets

METHODS AND SYSTEMS FOR FAST RANGING IN WIRELESS COMMUNICATION NETWORKS

PRIORITY APPLICATION

This application claims the benefit of priority from U.S. Provisional Patent Application Ser. No. 61/074,537, filed Jun. 20, 2008 and entitled "Methods and Systems for Fast Ranging in Wireless Communication Systems," which is fully incorporated herein by reference for all purposes.

TECHNICAL FIELD

The present disclosure relates generally to communication networks. More specifically, the present disclosure relates to methods and apparatus for fast ranging in wireless communication networks.

BACKGROUND

As used herein, the term "mobile station" refers to an electronic device that may be used for voice and/or data communication over a wireless communication network. Examples of mobile stations include cellular phones, personal digital assistants (PDAs), handheld devices, wireless modems, laptop computers, personal computers, etc. A mobile station may alternatively be referred to as an access terminal, a mobile terminal, a subscriber station, a remote station, a user terminal, a terminal, a subscriber unit, user equipment, etc.

A wireless communication network may provide communication for a number of mobile stations, each of which may be serviced by a base station. A base station may alternatively be referred to as an access point, a Node B, or some other terminology.

A mobile station may communicate with one or more base stations via transmissions on the uplink and the downlink. The uplink (or reverse link) refers to the communication link from the mobile station to the base station, and the downlink (or forward link) refers to the communication link from the base station to the mobile station.

The resources of a wireless communication network (e.g., bandwidth and transmit power) may be shared among multiple mobile stations. A variety of multiple access techniques are known, including code division multiple access (CDMA), time division multiple access (TDMA), frequency division multiple access (FDMA), and orthogonal frequency division multiple access (OFDMA).

Benefits may be realized by improved methods and apparatus related to the operation of wireless communication networks.

SUMMARY

Figure 1:
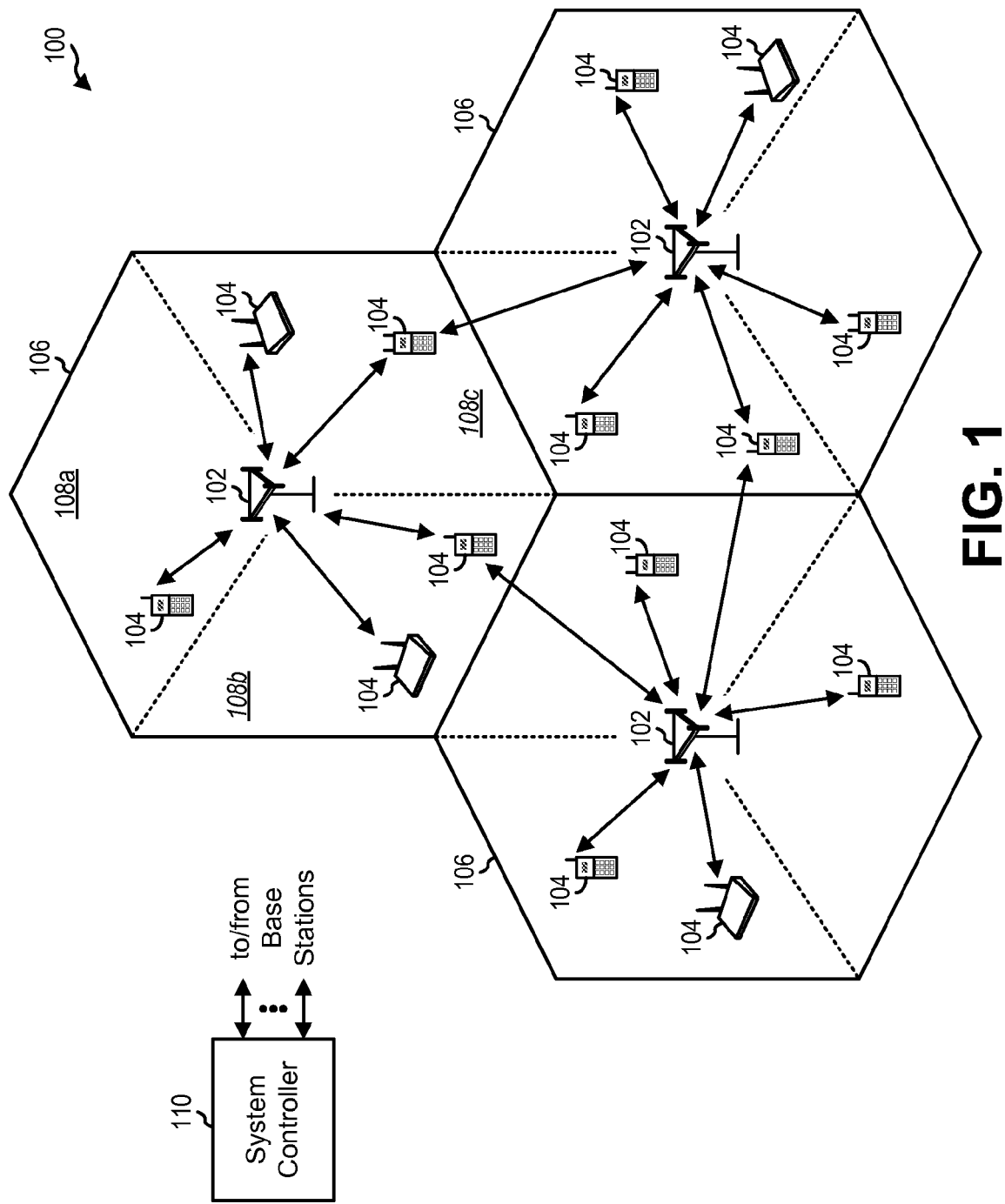
FIG. 1 illustrates a wireless communication system with multiple base stations and multiple mobile stations.

A method for efficiently performing ranging in a wireless communication network is disclosed. The method may be implemented by a mobile station. The method may include sending a ranging code to a base station. The method may also include receiving a ranging response message from the base station. The method may also include determining whether a ranging failure condition is satisfied. The ranging failure condition may relate to something other than a duration of time. The method may also include re-sending the ranging code to the base station if the ranging failure condition is satisfied.

A method for facilitating efficient ranging in a wireless communication network is disclosed. The method may be implemented by a base station. The method may include receiving ranging codes from mobile stations. The method may also include sending ranging response messages to the mobile stations in response to receiving the ranging codes. The ranging response messages may be sent in sequence, so that a ranging response message corresponding to a later frame number of a received ranging code is sent after all the ranging response messages corresponding to earlier frame numbers of received ranging codes are sent.

A mobile station configured for efficiently performing ranging in a wireless communication network is disclosed. The mobile station may include a processor. The mobile station may also include memory in electronic communication with the processor. The mobile station may include instructions stored in the memory. The instructions may be executable by the processor to send a ranging code to a base station. The instructions may also be executable to receive a ranging response message from the base station. The instructions may also be executable to determine whether a ranging failure condition is satisfied. The ranging failure condition may relate to something other than a duration of time. The instructions may further be executable to re-send the ranging code to the base station if the ranging failure condition is satisfied.

A base station configured for facilitating efficient ranging in a wireless communication network is disclosed. The base station may include a processor. The base station may also include memory in electronic communication with the processor. The base station may also include instructions stored in the memory. The instructions may be executable by the processor to receive ranging codes from mobile stations. The instructions may also be executable to send ranging response messages to the mobile stations in response to receiving the ranging codes. The ranging response messages may be sent in sequence, so that a ranging response message corresponding to a later frame number of a received ranging code is sent after all the ranging response messages corresponding to earlier frame numbers of received ranging codes are sent.

A mobile station configured for efficiently performing ranging in a wireless communication network is disclosed.

The mobile station may include means for sending a ranging code to a base station. The mobile station may also include means for receiving a ranging response message from the base station. The mobile station may also include means for determining whether a ranging failure condition is satisfied. The ranging failure condition may relate to something other than a duration of time. The mobile station may further include means for re-sending the ranging code to the base station if the ranging failure condition is satisfied.

A base station configured for facilitating efficient ranging in a wireless communication network is disclosed. The base station may include means for receiving ranging codes from mobile stations. The base station may also include means for sending ranging response messages to the mobile stations in response to receiving the ranging codes. The ranging response messages may be sent in sequence, so that a ranging response message corresponding to a later frame number of a received ranging code is sent after all the ranging response messages corresponding to earlier frame numbers of received ranging codes are sent.

A computer-program product for efficiently performing ranging in a wireless communication network is disclosed. The computer-program product may include a computer-readable medium having instructions thereon. The instructions may include code for sending a ranging code to a base station. The instructions may also include code for receiving a ranging response message from the base station. The instructions may also include code for determining whether a ranging failure condition is satisfied. The ranging failure condition may relate to something other than a duration of time. The instructions may further include code for re-sending the ranging code to the base station if the ranging failure condition is satisfied.

A computer-program product for facilitating efficient ranging in a wireless communication network is disclosed. The computer-program product may include a computer-readable medium having instructions thereon. The instructions may include code for receiving ranging codes from mobile stations. The instructions may also include code for sending ranging response messages to the mobile stations in response to receiving the ranging codes. The ranging response messages may be sent in sequence, so that a ranging response message corresponding to a later frame number of a received ranging code is sent after all the ranging response messages corresponding to earlier frame numbers of received ranging codes are sent.

DETAILED DESCRIPTION

The methods and apparatus of the present disclosure may be utilized in a broadband wireless communication network. The term "broadband wireless" refers to technology that provides wireless, voice, Internet, and/or data network access over a given area.

The Institute of Electronic and Electrical Engineers (IEEE) 802.16 Working Group on Broadband Wireless Access Standards aims to prepare formal specifications for the global deployment of broadband Wireless Metropolitan Area Networks. Although the 802.16 family of standards is officially called WirelessMAN, it has been called "WiMAX" (which stands for the "Worldwide Interoperability for Microwave Access") by an industry group called the WiMAX Forum. Thus, the term "WiMAX" refers to a standards-based broadband wireless technology that provides high-throughput broadband connections over long distances.

Some of the examples described herein are relevant to wireless communication networks that are configured in accordance with WiMAX standards. However, these examples should not be interpreted as limiting the scope of the present disclosure.

WiMAX is based on OFDM (orthogonal frequency division multiplexing) and OFDMA (orthogonal frequency division multiple access) technology. OFDM is a digital multi-carrier modulation technique that has recently found wide adoption in a variety of high-data-rate communication networks. With OFDM, a transmit bit stream is divided into multiple lower-rate substreams. Each substream is modulated with one of multiple orthogonal subcarriers and sent over one of a plurality of parallel subchannels. OFDMA is a multiple access technique in which users are assigned subcarriers in different time slots. OFDMA is a flexible multiple-access technique that can accommodate many users with widely varying applications, data rates, and quality of service requirements.

FIG. 1 shows a wireless communication system 100 with multiple base stations (BS) 102 and multiple mobile stations (MS) 104. A base station 102 is a station that communicates with the mobile stations 104. A base station 102 may also be called, and may contain some or all of the functionality of, an access point, a Node B, an evolved Node B, etc. Each base station 102 provides communication coverage for a particular geographic area 106. The term "cell" can refer to a base station 102 and/or its coverage area 106 depending on the context in which the term is used. To improve system capacity, a base station coverage area 106 may be partitioned into multiple smaller areas, e.g., three smaller areas 108a, 108b, and 108c. Each smaller area 108a, 108b, 108c may be served by a respective base transceiver station (BTS). The term "sector" can refer to a BTS and/or its coverage area 108 depending on the context in which the term is used. For a sectorized cell, the BTSs for all sectors of that cell are typically co-located within the base station 102 for the cell.

Mobile stations 104 are typically dispersed throughout the system 100, and each mobile station 104 may be stationary or mobile. A mobile station 104 may also be called, and may contain some or all of the functionality of, a terminal, an access terminal, a user equipment, a subscriber unit, a station, etc. A mobile station 104 may be a cellular phone, a personal digital assistant (PDA), a wireless device, a wireless modem, a handheld device, a laptop computer, etc. A mobile station 104 may communicate with zero, one, or multiple base stations 102 on the downlink (DL) and/or uplink (UL) at any given moment. The downlink (or forward link) refers to the communication link from the base stations 102 to the mobile stations 104, and the uplink (or reverse link) refers to the communication link from the mobile stations 104 to the base stations 102.

For a centralized architecture, a system controller 110 may couple to base stations 102 and provide coordination and control for these base stations 102. The system controller 110 may be a single network entity or a collection of network entities. For a distributed architecture, base stations 102 may communicate with one another as needed.

Figure 2:
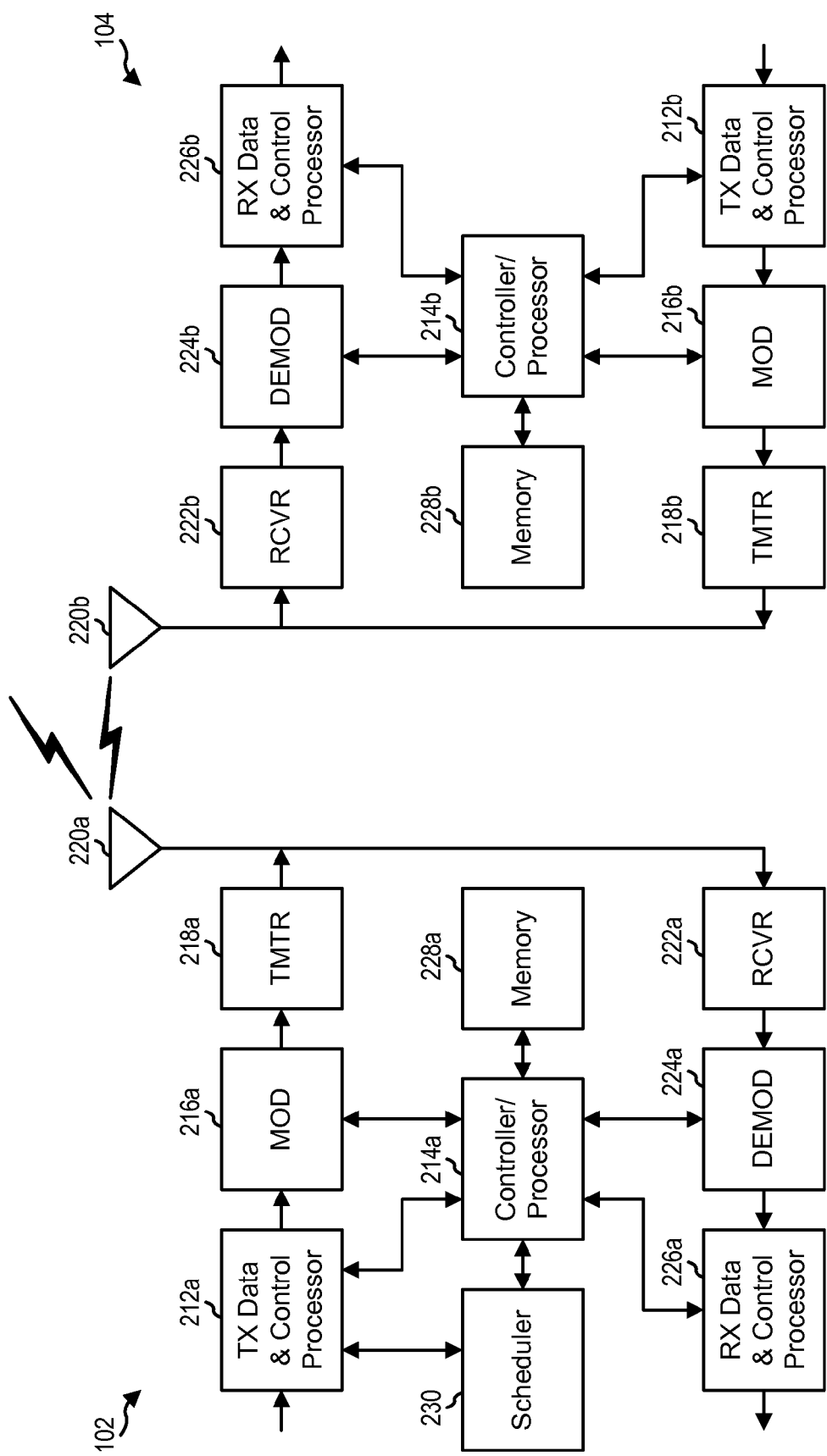
FIG. 2 illustrates a block diagram of a design of a base station and a mobile station.

FIG. 2 shows a block diagram of a design of a base station 102 and a mobile station 104, which may be one of the base stations 102 and one of the mobile stations 104 in FIG. 1. At the base station 102, a transmit (TX) data and control processor 212a may receive traffic data from a data source (not shown) and/or control information from a controller/processor 214a. The processor 212a may process (e.g., format, encode, interleave, and symbol map) the traffic data and control information and provide modulation symbols. A modulator (MOD) 216a may process the modulation symbols (e.g., for OFDM) and provide output chips. A transmitter (TMTR)

218a may process (e.g., convert to analog, amplify, filter, and upconvert) the output chips and generate a downlink signal, which may be transmitted via an antenna 220a.

At the mobile station 104, an antenna 220b may receive the downlink signals from the base station 102 and other base stations 102 and may provide a received signal to a receiver (RCVR) 222b. The receiver 222b may condition (e.g., filter, amplify, downconvert, and digitize) the received signal and provide received samples. A demodulator (DEMOD) 224b may process the received samples (e.g., for OFDM) and provide demodulated symbols. A receive (RX) data and control processor 226b may process (e.g., symbol demap, deinterleave, and decode) the demodulated symbols to obtain decoded data and control information for the mobile station 104.

On the uplink, at the mobile station 104, data and control information to be sent by the mobile station 104 may be processed by a TX data and control processor 212b, modulated by a modulator 216b, conditioned by a transmitter 218b, and transmitted via an antenna 220b. At the base station 102, the uplink signals from the mobile station 104 and possibly other mobile stations 104 may be received by an antenna 220a, conditioned by a receiver 222a, demodulated by a demodulator 224a, and processed by an RX data and control processor 226a to recover the data and control information sent by the mobile station 104. In general, the processing for uplink transmission may be similar to or different from the processing for downlink transmission.

Controllers/processors 214a and 214b may direct the operation at the base station 102 and the mobile station 104, respectively. Memories 228a and 228b may store data and program codes for the base station 102 and the mobile station 104, respectively. A scheduler 230 may schedule mobile stations 104 for downlink and/or uplink transmission and may provide assignments of system resources.

Figure 3:
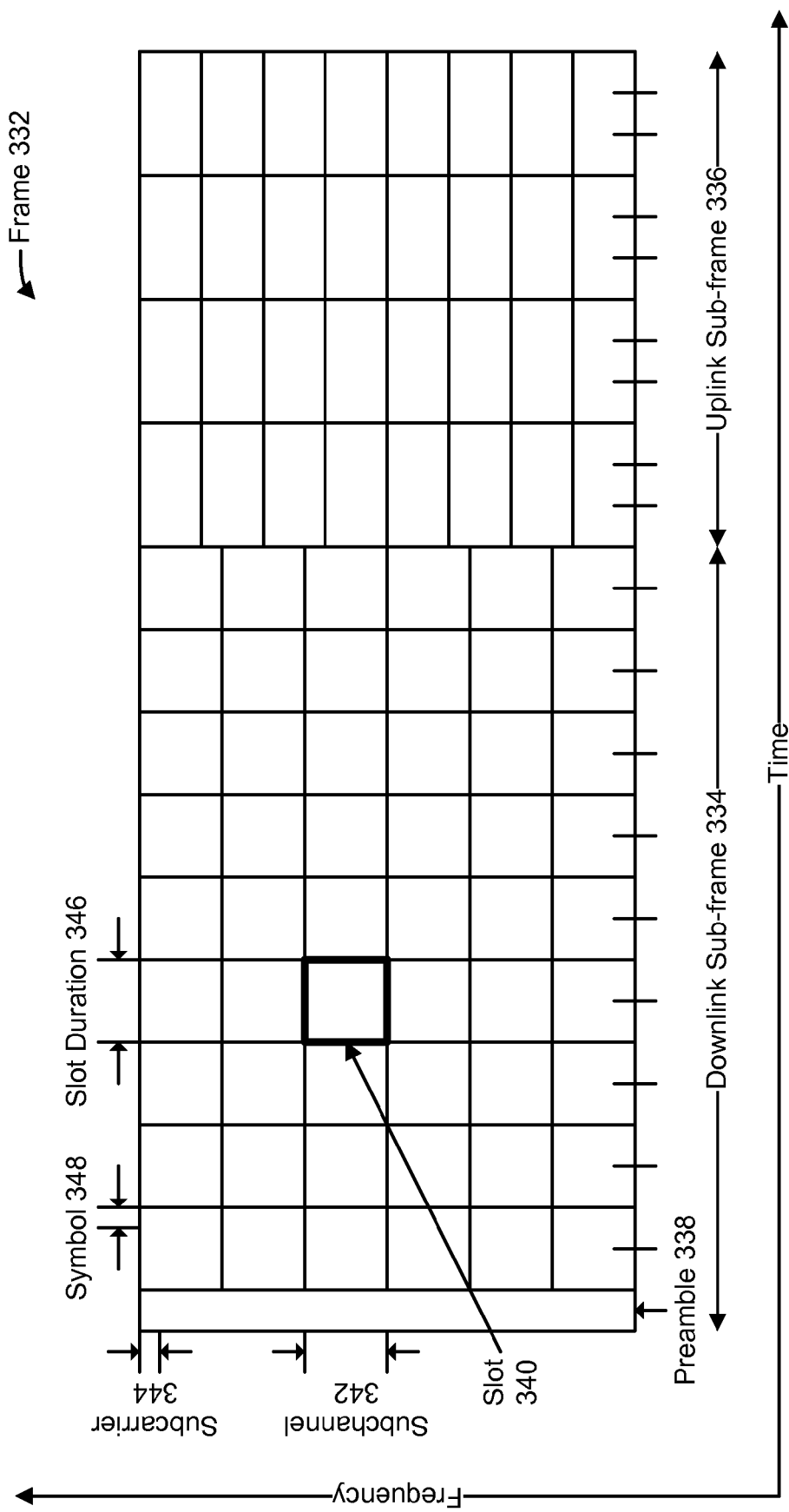
FIG. 3 illustrates an example showing certain aspects of the structure of a frame in a WiMAX network.

FIG. 3 illustrates an example showing certain aspects of the structure of a frame 332 in a WiMAX network. In a WiMAX network, a frame 332 is a time interval of constant length. For time division duplex (TDD) operation, each frame 332 is divided into a downlink (DL) sub-frame 334 and an uplink (UL) sub-frame 336. The downlink sub-frame 334 begins with a preamble 338.

In a WiMAX network, a slot 340 is the smallest unit to allocate bandwidth to users. A slot 340 is a subchannel 342 (i.e., a group of subcarriers 344) over a slot duration 346 (i.e., a certain number of symbols 348).

Figure 4:
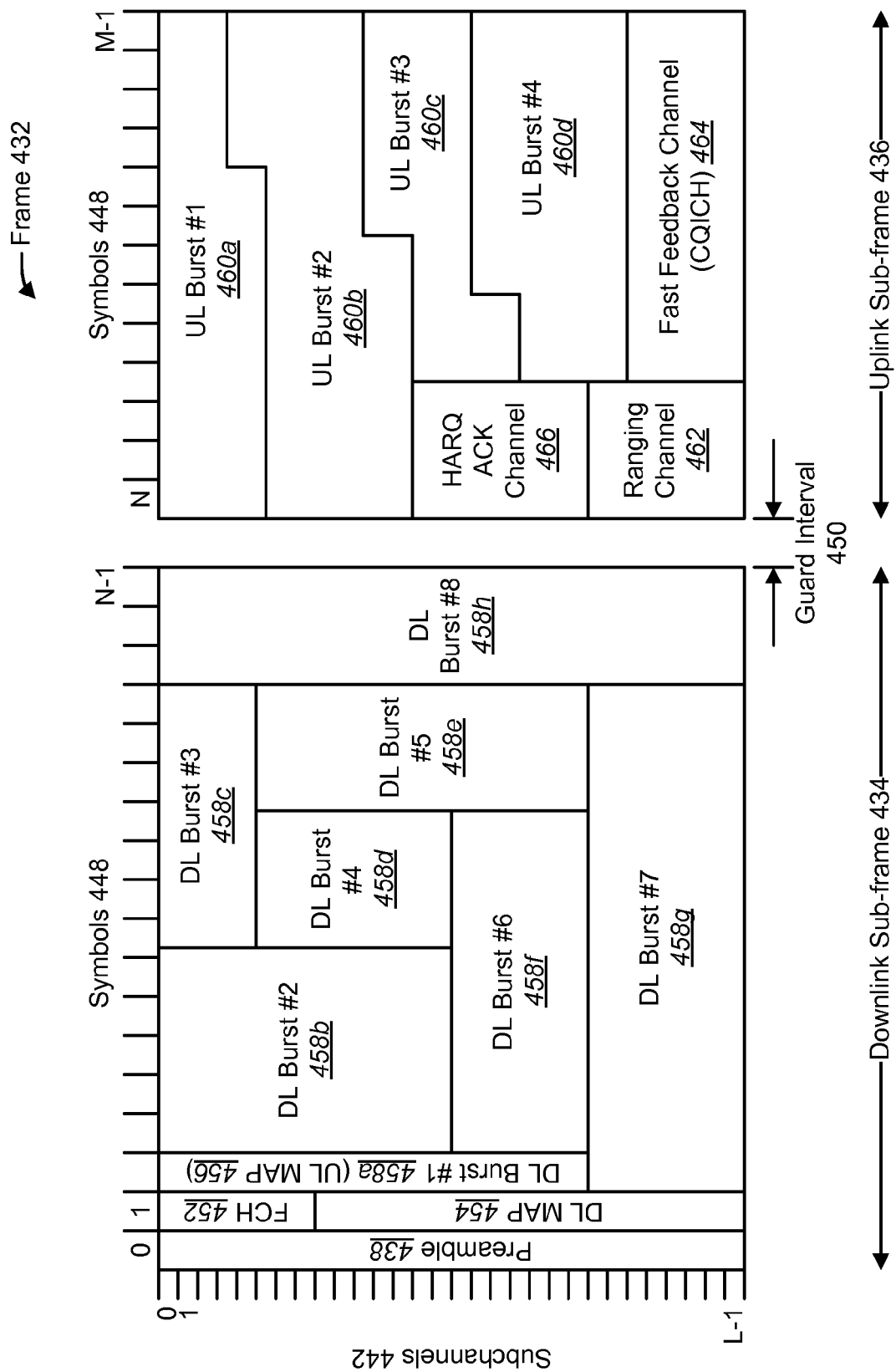
FIG. 4 illustrates an example showing certain additional aspects of the structure of a frame in a WiMAX network.

FIG. 4 illustrates an example showing certain additional aspects of the structure of a frame 432 in a WiMAX network. The frame 432 includes a downlink sub-frame 434 and an uplink sub-frame 436, separated by a guard interval 450. The frame 432 is transmitted over L subchannels 442. There are a total of M symbols 448 in the frame 432, N symbols 448 in the downlink sub-frame 434 and M-N symbols 448 in the uplink sub-frame 436.

The downlink sub-frame 434 includes a preamble 438. The preamble 438 is used for physical layer procedures, such as time and frequency synchronization and initial channel estimation. The downlink sub-frame 434 also includes a frame control header (FCH) 452. The FCH 452 provides frame 432 configuration information, such as the MAP message length, the modulation and coding scheme, and the usable sub channels 442.

Multiple users are allocated data regions within the frame 432, and these allocations are specified in the downlink MAP message 454 and the uplink MAP message 456. The MAP messages 454 and 456 include the burst profile for each user, which defines the modulation and coding scheme that are used.

The downlink sub-frame 434 also includes multiple downlink bursts 458a-h. The first downlink burst 458a is typically the uplink MAP message 456. The downlink bursts 458a-h may be of varying size and type, and may carry data for several users.

The uplink sub-frame 436 includes multiple uplink bursts 460a-d, which may be from different users. The uplink sub-frame 436 also includes a ranging channel 462, which may be used to perform closed-loop frequency, time, and power adjustments during network entry as well as periodically afterward. The ranging channel 462 may also be used by mobile stations to make uplink bandwidth requests.

The uplink sub-frame 436 also includes a channel-quality indicator channel (CQICH) 464 for the mobile stations to feed back channel-quality information that can be used by the scheduler at the base station. The CQICH 464 may also be referred to as a fast feedback channel 464. The uplink sub-frame 436 also includes a hybrid automatic repeat request (HARQ) acknowledgement (ACK) channel 466, which may be used by mobile stations to feed back downlink acknowledgements.

The present disclosure relates generally to ranging. Ranging is a procedure that may be utilized by the WiMAX mobile station in order to adjust timing, power, and frequency of transmitted signals. Additionally, a mobile station may utilize ranging in order to acquire the Basic CID (Connection ID) and Primary Management CID, and/or to request bandwidth. Ranging can be the first procedure that is performed by the mobile station upon entering a WiMAX network. Additionally, ranging may be utilized by a mobile station after entering a WiMAX network (e.g., in order to request bandwidth).

Figure 5:
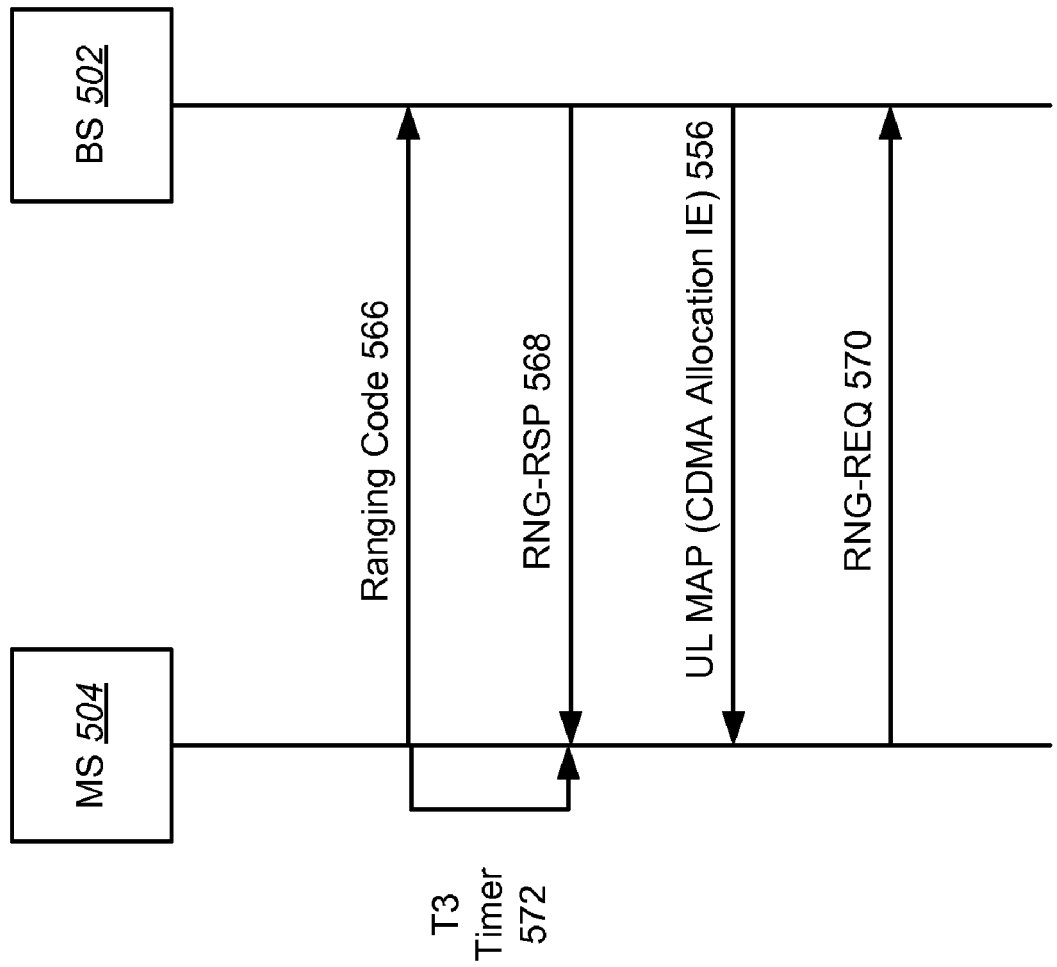
FIG. 5 illustrates an example of a ranging procedure involving a mobile station and a base station.

Reference is now made to FIG. 5. FIG. 5 illustrates an example of a ranging procedure involving a mobile station (MS) 504 and a base station (BS) 502.

In the depicted ranging procedure, the mobile station 504 may send a ranging code 566 to the base station 502. When the base station 502 receives the ranging code 566, the base station 502 may reply with a ranging response message (RNG-RSP) 568. The base station 502 may send the ranging response message 568 in an anonymous manner in which the frame number, the symbol number, the subchannel number and the ranging code 566 used by the mobile station 504 are identified. By matching these ranging code attributes, the mobile station 504 can know whether or not the ranging response message 568 is for the mobile station 504.

If the mobile station 504 determines that the ranging response message 568 is for the mobile station 504, then the mobile station 504 and the base station 502 may continue with the ranging procedure. For example, the base station 502 may send the uplink MAP (UL MAP) message 556 to the mobile station 504. The mobile station 504 may send a ranging request message (RNG-REQ) 570 to the base station 502.

On the other hand, if the mobile station 504 does not receive a ranging response message 568 with matching ranging code attributes within a certain period of time after sending the ranging code 566, the mobile station 504 may determine that there has been a failure in ranging. The mobile station 504 may then re-send the ranging code 566. In the WiMAX standards, the period of time that the mobile station 504 waits before re-sending the ranging code 566 is defined by a T3 timer 572. The default value for the T3 timer 572 is 50 ms, and the maximum value for the T3 timer 572 is 200 ms.

The current approach for discovering ranging failure can result in a long processing delay, and therefore the current approach may consume a significant amount of battery power. The present disclosure relates to techniques for alleviating such issues.

The original 802.16 standard was completed in December 2001. Further revisions resulted in a new standard in 2004, called IEEE 802.16-2004. An amendment to 802.16-2004, called IEEE 802.16e-2005, was concluded in 2005. IEEE 802.16e-2005 is sometimes referred to as IEEE 802.16e. Another amendment, called IEEE 802.16m, is currently being prepared.

In the proposed frame structure of IEEE 802.16m, each frame is divided into a number of subframes. IEEE 802.16e and IEEE 802.16m terminals occupy different subframes. One way to reduce the amount of ranging overhead is to allow both IEEE 802.16e and IEEE 802.16m terminals to share the same ranging region. The ranging codes may then be split into two different sets of ranging codes. The first set of ranging codes is to be used by IEEE 802.16e terminals and the second set of ranging codes is to be used by IEEE 802.16m terminals. Part of the ranging attributes in the ranging response message can be set to indicate whether the ranging response message is for a ranging code from set 1 (i.e., IEEE 802.16e) or set 2 (i.e., IEEE 802.16m).

The present disclosure proposes that the base station should send ranging response messages (RNG-RSPs) to all the detected ranging codes in sequence. That is, a ranging response message of ranging code attributes with a later frame number should be sent after all ranging response messages of ranging code attributes with earlier frame numbers. Since the frame number of ranging code attributes indicates the least significant 8 bits of the actual frame number, frame M is earlier than frame N if either condition (1) or condition (2) below is satisfied.

$$N-128<M<N \qquad (1)$$

$$N+128<M<N+256 \qquad (2)$$

Assume that a mobile station that is configured in accordance with IEEE 802.16e (hereinafter, a "16e MS") sends a ranging code on the frame with the least significant 8 bits of frame number=M. In this example, the 16e MS can determine ranging failure if: (1) the ranging attributes of a received ranging response message correspond to set 1 (i.e., IEEE 802.16e terminals); (2) the ranging response message includes the least significant 8 bits of frame number=N; (3) M is earlier than N; and (4) in the same WiMAX frame, there are not any other ranging response messages for this MS. When these conditions are met, even if the T3 timer has not expired, the MS can stop monitoring RNG-RSP messages and immediately retry sending the ranging code using the backoff algorithm as defined in the WiMAX standards.

Figure 6:
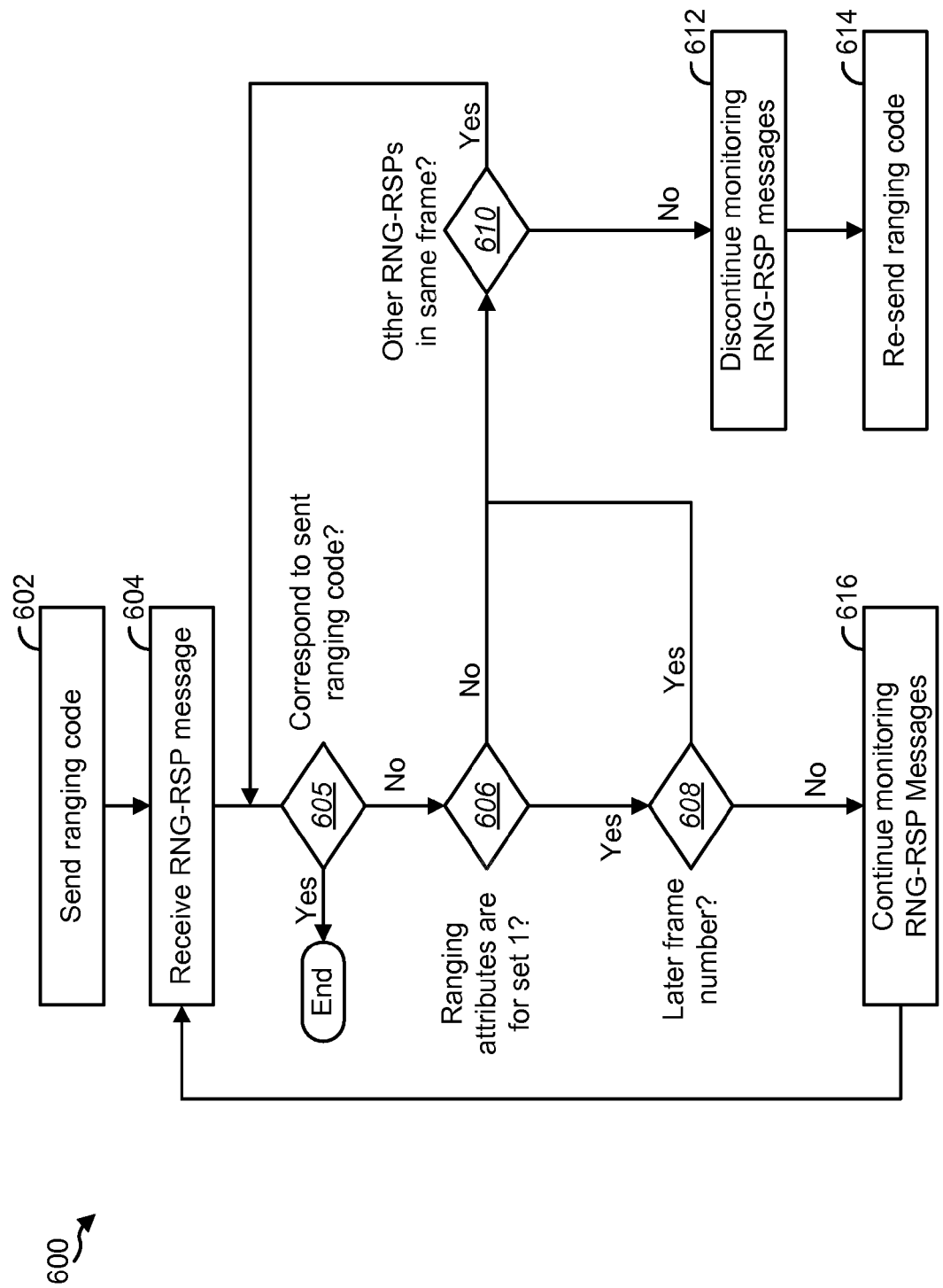
FIG. 6 illustrates an example of a method for efficiently performing ranging in a wireless communication network.

Reference is now made to FIG. 6. FIG. 6 illustrates an example of a method 600 for efficiently performing ranging in a wireless communication network, such as a WiMAX network. The method 600 may be implemented by a mobile station. The mobile station may be configured in accordance with IEEE 802.16e.

In the depicted method 600, the mobile station may send 602 a ranging code to the base station. At some point after sending 602 the ranging code to the base station, the mobile station may receive 604 a ranging response message (RNG-RSP) from the base station. Upon receiving 604 the ranging response message, the mobile station may determine 605 whether the received ranging response message corresponds to the ranging code that was sent. If it does, then the method 600 may end.

If it is determined 605 that the received ranging response message does not correspond to the ranging code that was sent, then the mobile station may determine 606 whether the ranging attributes that are specified in the ranging response message correspond to set 1 (i.e., IEEE 802.16e terminals).

If the mobile station determines 606 that the ranging attributes that are specified in the ranging response message correspond to set 1, the mobile station may then determine 608 whether the frame number that corresponds to the ranging response message is later than the frame number that corresponds to the ranging code. This may involve determining whether either condition (1) or condition (2), specified above, is satisfied.

If the mobile station determines 608 that the frame number that corresponds to the ranging response message is later than the frame number that corresponds to the ranging code, then the mobile station may determine 610 whether it has received any other ranging response messages in the same frame. If not, then the mobile station may discontinue 612 monitoring ranging response messages, and the mobile station may re-send 614 the ranging code to the base station.

If the mobile station determines 608 that the frame number included in the ranging response message is not later than the frame number that corresponds to the ranging code being previously sent, then the mobile station may continue 616 monitoring ranging response messages.

If the mobile station determines 606 that the ranging attributes that are specified in the ranging response message do not apply to the mobile station, then the mobile station may determine 610 whether it has received any other ranging response messages in the same frame. If it has, then each additional ranging response message may be processed in the same manner as described above.

Figure 7:
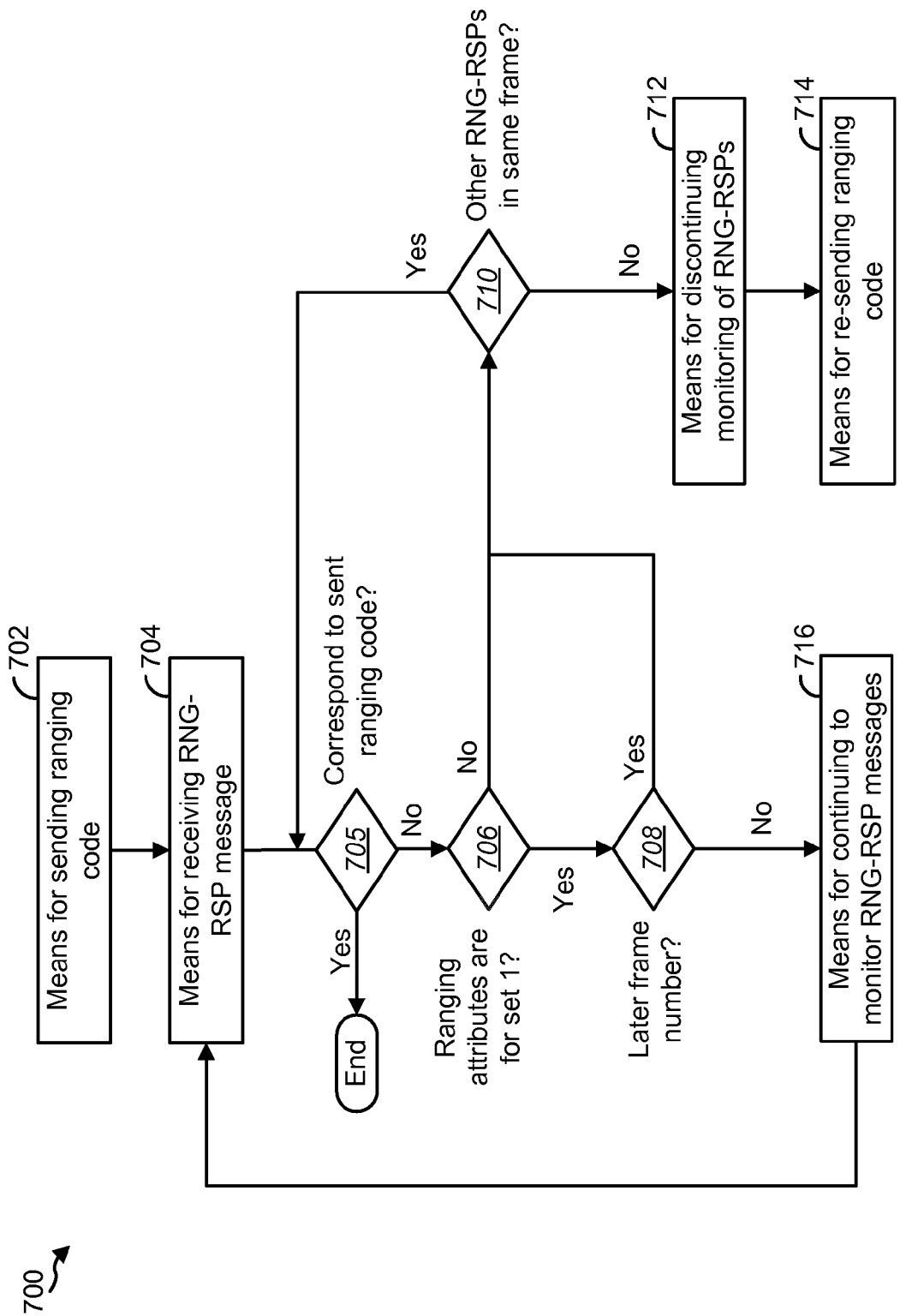
FIG. 7 illustrates means-plus-function blocks corresponding to the method of FIG. 6.

The method 600 of FIG. 6 described above may be performed by various hardware and/or software component(s) and/or module(s) corresponding to the means-plus-function blocks 700 illustrated in FIG. 7. In other words, blocks 602 through 616 illustrated in FIG. 6 correspond to means-plus-function blocks 702 through 716 illustrated in FIG. 7.

Figure 8:
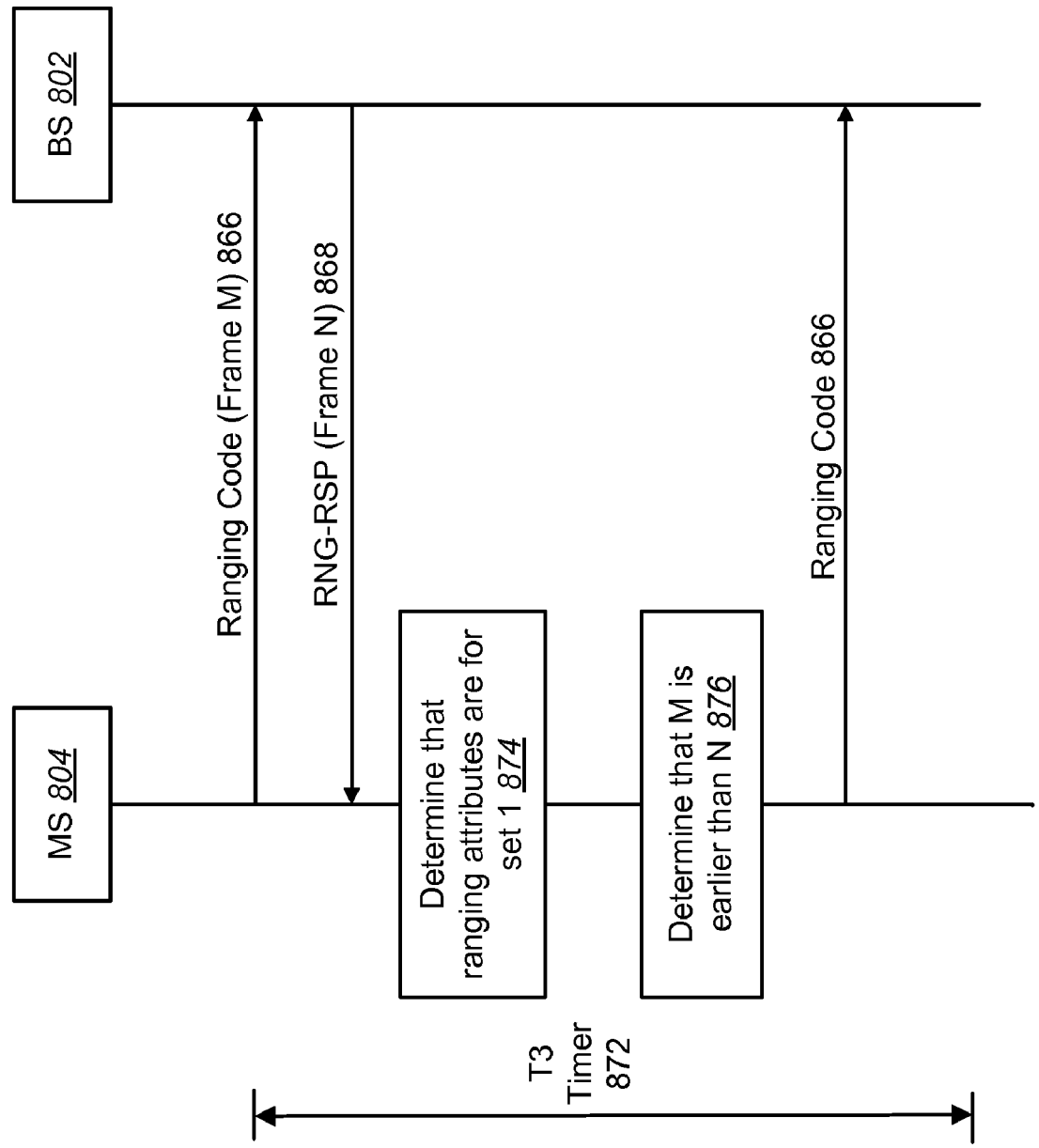
FIG. 8 illustrates an example of the ranging method of FIG. 6.

Reference is now made to FIG. 8. FIG. 8 illustrates an example of the ranging method 600 of FIG. 6. The depicted example illustrates a ranging procedure involving a mobile station (MS) 804 and a base station (BS) 802. The mobile station 804 may be configured in accordance with IEEE 802.16e.

In the depicted example, the mobile station 804 sends a ranging code 866 to the base station 802. The ranging code 866 was sent on the frame with the least significant 8 bits of the frame number=M. The base station 802 sends a ranging response message (RNG-RSP) 868 to the mobile station 804. The ranging response message 868 includes the least significant 8 bits of the frame number of frame N where the mobile station 804 sent the corresponding ranging code 866.

Upon receiving the ranging response message 868, the mobile station 804 determines 874 that the ranging attributes that are specified in the ranging response message 868 correspond to set 1 (i.e., IEEE 802.16e terminals).

The mobile station 804 also determines 876 that frame M is earlier than frame N. This may involve determining whether either condition (1) or condition (2), specified above, is satisfied.

If the mobile station 804 has not received any other ranging response messages 868 in the same frame, then the mobile station 804 may re-send the ranging code 866 to the base station 802. This may occur before expiration of the T3 timer 872 that is currently specified in WiMAX standards. Accordingly, the techniques described herein can reduce latency in ranging as compared to known approaches.

Figure 9:
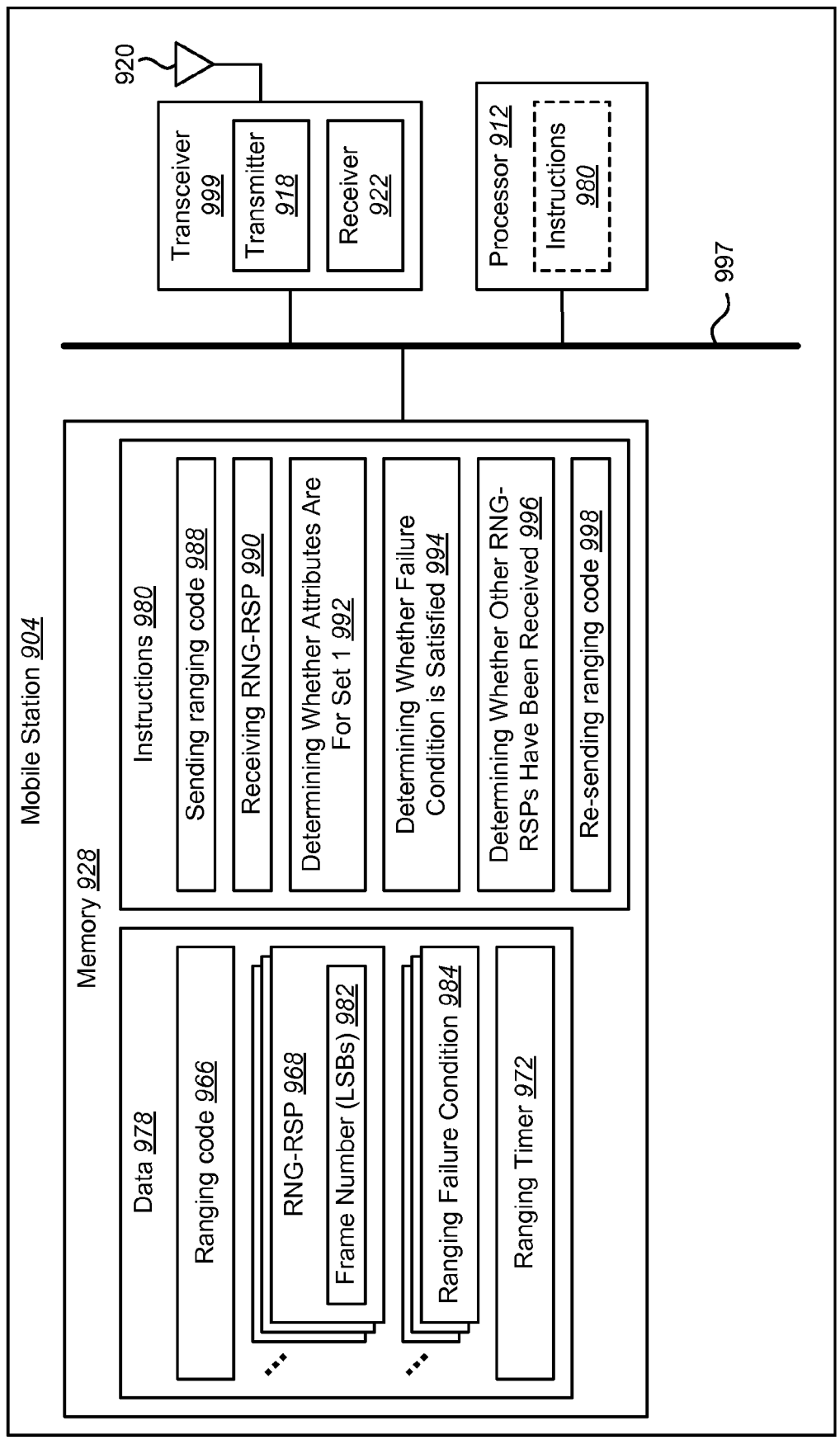
FIG. 9 illustrates certain components that may be included within a mobile station that is configured for efficiently performing ranging in accordance with the present disclosure.

Reference is now made to FIG. 9. FIG. 9 illustrates certain components that may be included within a mobile station 904 that is configured for efficiently performing ranging in accordance with the present disclosure.

The mobile station 904 includes a processor 912. The processor 912 may be a general purpose single- or multi-chip microprocessor (e.g., an ARM), a special purpose microprocessor (e.g., a digital signal processor (DSP)), a microcontroller, a programmable gate array, etc. The processor 912 may be referred to as a central processing unit (CPU). Although just a single processor 912 is shown in the mobile station 904 of FIG. 9, in an alternative configuration, a combination of processors (e.g., an ARM and DSP) could be used.

The mobile station 904 also includes memory 928. The memory 928 may be any electronic component capable of storing electronic information. The memory 928 may be embodied as random access memory (RAM), read only memory (ROM), magnetic disk storage media, optical storage media, flash memory devices in RAM, on-board memory included with the processor, EPROM memory, EEPROM memory, registers, and so forth, including combinations thereof.

Data 978 and instructions 980 may be stored in the memory 928. The instructions 980 may be executable by the processor 912 to implement various functions. Executing the instructions 980 may involve the use of the data 978 that is stored in the memory 928.

The data 978 in the memory 928 may include a ranging code 966 to be transmitted to a base station. The ranging code 966 may be sent by the mobile station 904, as described above.

The data 978 in the memory 928 may also include multiple ranging response messages 968 received from the base station. Each ranging response message 968 may include the least significant 8 bits of the frame number 982 of frame N where the mobile station 904 sent the corresponding ranging code 966.

The data 978 in the memory 928 may also include one or more ranging failure conditions 984. Each ranging failure condition 984 may relate to something other than a duration of time. Examples of ranging failure conditions 984 are conditions (1) and (2) described above. Both of these ranging failure conditions 984 are related to whether a frame number corresponding to a transmitted ranging code 966 is earlier than a frame number corresponding to a received ranging response message 968.

The data 978 in the memory 928 may also include a ranging timer 972. An example of a ranging timer 972 is the T3 timer that is specified in current WiMAX standards.

Other types of data 978 that are relevant to implementing the techniques described herein may also be included in the memory 928.

The instructions 980 in the memory 928 may include instructions 988 for sending a ranging code 966 to a base station, and instructions 990 for receiving a ranging response message 968 from the base station. In addition, the instructions 980 in the memory 928 may include instructions 992 for determining whether ranging attributes in the ranging code 966 correspond to set 1 (IEEE 802.16e).

The instructions 980 in the memory 928 may also include instructions 994 for determining whether a ranging failure condition 984 is satisfied. In addition, the instructions 980 in the memory 928 may include instructions 996 for determining whether any additional ranging response messages 968 have been received in the same frame.

The instructions 980 in the memory 928 may also include instructions 998 for re-sending the ranging code 966 to the base station if ranging attributes in the ranging code 966 correspond to set 1, at least one ranging failure condition 984 is satisfied, and no additional ranging response messages 968 have been received in the same frame.

Other instructions 980 that are relevant to implementing the techniques described herein may also be included in the memory 928.

The mobile station 904 may also include a transmitter 918 and a receiver 922 to allow transmission and reception of signals between the mobile station 904 and a remote location. The transmitter 918 and receiver 922 may be collectively referred to as a transceiver 999. An antenna 920 may be electrically coupled to the transceiver 999. The mobile station 904 may also include (not shown) multiple transmitters, multiple receivers, multiple transceivers and/or multiple antenna.

The various components of the mobile station 904 may be coupled together by one or more buses, which may include a power bus, a control signal bus, a status signal bus, a data bus, etc. For the sake of clarity, the various buses are illustrated in FIG. 9 as a bus system 997.

Figure 10:
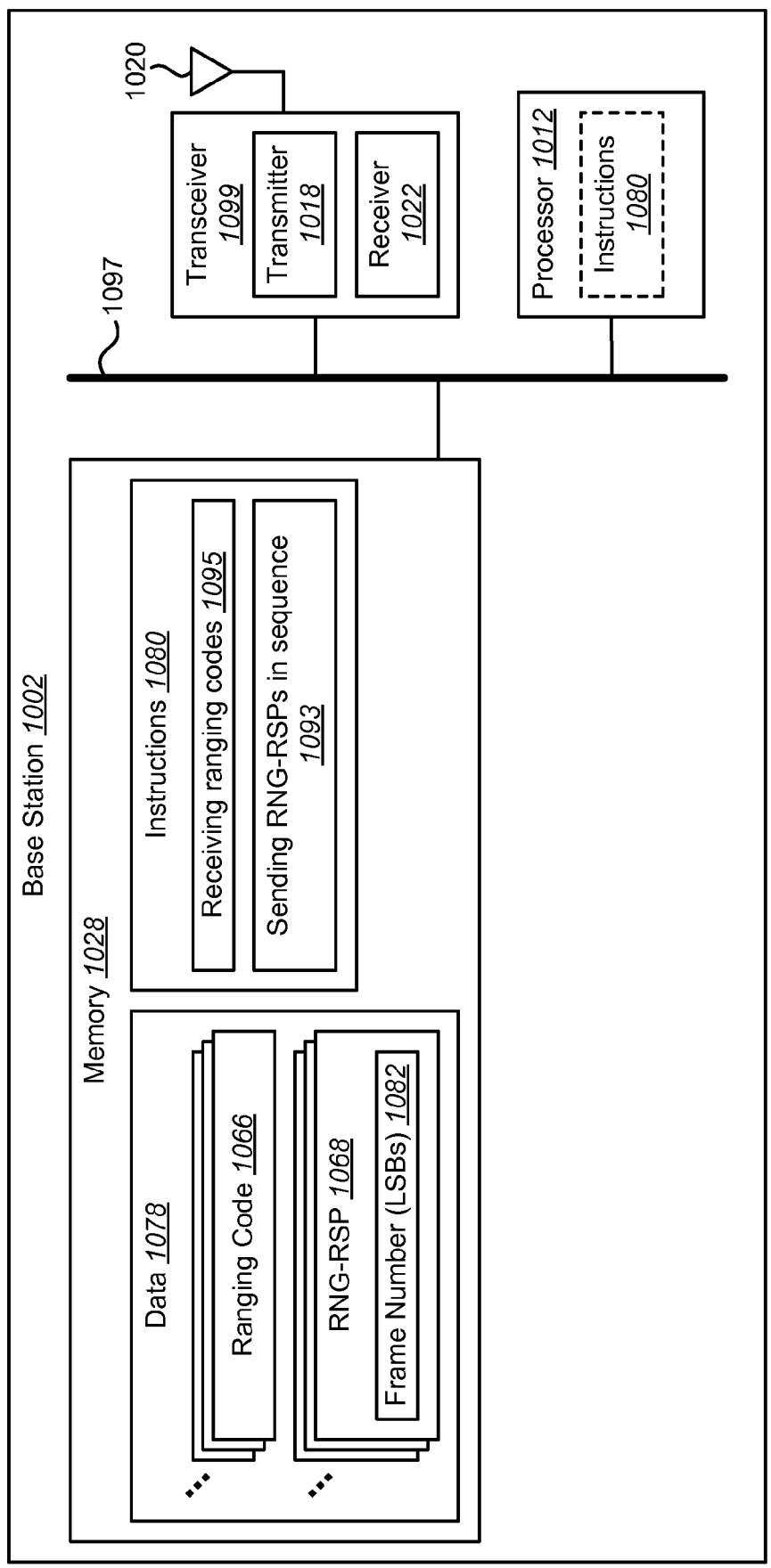
FIG. 10 illustrates certain components that may be included within a base station that is configured for facilitating efficient ranging in accordance with the present disclosure.

Reference is now made to FIG. 10. FIG. 10 illustrates certain components that may be included within a base station 1002 that is configured for facilitating efficient ranging in accordance with the present disclosure.

The base station 1002 includes many components that are similar to the components of the mobile station 904 of FIG. 9, including a processor 1012, memory 1028 storing both data 1078 and instructions 1080, a transceiver 1099 including a transmitter 1018 and a receiver 1022, an antenna 1020, and a system bus 1097.

The data 1078 in the memory 1028 may include multiple ranging codes 1066 received from mobile stations. The ranging codes 1066 may be received from mobile stations, as described above.

The data 1078 in the memory 1028 may also include multiple ranging response messages 1068. A particular ranging response message 1068 may be transmitted to a mobile station in response to receipt of a particular ranging code 1066. Each ranging response message 1068 may include the least significant 8 bits of the frame number 1082 of frame N where the mobile station sent the corresponding ranging code 1066.

Other types of data 1078 that are relevant to implementing the techniques described herein may also be included in the memory 1028.

The instructions 1080 in the memory 1028 may include instructions 1095 for receiving ranging codes 1066 from mobile stations, and instructions 1093 for sending ranging response messages 1068 to mobile stations in response to receiving the ranging codes 1066. The ranging response messages 1068 may be sent in sequence, so that the ranging response message 1068 corresponding to a later frame number of a received ranging code is sent after all the ranging response messages 1068 corresponding to earlier frame numbers of received ranging codes are sent.

Other instructions 1080 that are relevant to implementing the techniques described herein may also be included in the memory 1028.

The techniques described herein may be used for various communication systems, including communication systems that are based on an orthogonal multiplexing scheme. Examples of such communication systems include Orthogonal Frequency Division Multiple Access (OFDMA) systems, Single-Carrier Frequency Division Multiple Access (SC-FDMA) systems, and so forth. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA.

In the above description, reference numbers have sometimes been used in connection with various terms. Where a term is used in connection with a reference number, this is meant to refer to a specific element that is shown in one or more of the Figures. Where a term is used without a reference number, this is meant to refer generally to the term without limitation to any particular Figure. For example, a reference to "mobile station 904" refers to the specific mobile station that is shown in FIG. 9. However, the use of "mobile station" without a reference number refers to any mobile station that is appropriate for the context in which the term is used, and is not limited to any particular mobile station shown in the Figures.

As used herein, the term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The term "processor" should be interpreted broadly to encompass a general purpose processor, a central processing unit (CPU), a microprocessor, a digital signal processor (DSP), a controller, a microcontroller, a state machine, and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a DSP and a microprocessor, a plurality of microprocessors, one or more microprocessors in conjunction with a DSP core, or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read only memory (EPROM), electrically erasable PROM (EEPROM), flash memory, magnetic or optical data storage, registers, etc. Memory is said to be in electronic communication with a processor if the processor can read information from and/or write information to the memory. Memory may be integral to a processor and still be said to be in electronic communication with the processor.

The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may comprise a single computer-readable statement or many computer-readable statements.

The functions described herein may be implemented in hardware, software, firmware, or any combination thereof. If implemented in software, the functions may be stored as one or more instructions on a computer-readable medium. The term "computer-readable medium" refers to any available medium that can be accessed by a computer. By way of example, and not limitation, a computer-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray® disc where disks usually reproduce data magnetically, while discs reproduce data optically with lasers.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

Further, it should be appreciated that modules and/or other appropriate means for performing the methods and techniques described herein, such as those illustrated by FIG. 6, can be downloaded and/or otherwise obtained by a mobile station and/or base station as applicable. For example, such a device can be coupled to a server to facilitate the transfer of means for performing the methods described herein. Alternatively, various methods described herein can be provided via a storage means (e.g., random access memory (RAM), read only memory (ROM), a physical storage medium such as a compact disc (CD) or floppy disk, etc.), such that a mobile station and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the systems, methods, and apparatus described herein without departing from the scope of the claims.

What is claimed is:

1. A method for efficiently performing ranging in a wireless communication network, the method being implemented by a mobile station, the method comprising:
sending a ranging code to a base station;
receiving a ranging response message from the base station;

determining whether a ranging failure condition is satisfied, wherein the ranging failure condition comprises a first frame number corresponding to the ranging code and to a first frame being lower than a second frame number corresponding to the ranging response message and to a second frame, wherein the first frame is transmitted earlier than the second frame, and wherein the ranging failure condition relates to something other than a duration of time; and re-sending the ranging code to the base station if the ranging failure condition is satisfied.

2. The method of claim 1, wherein the ranging failure condition is expressed as N−128<M<N, wherein M indicates the least significant 8 bits of a first frame number, wherein the least significant 8 bits of the first frame number are the frame number of the OFDMA frame where the mobile station sent the ranging code, wherein N indicates the least significant 8 bits of a second frame number, and wherein the least significant 8 bits of the second frame number are specified in the ranging response message's attributes.

3. The method of claim 1, wherein the ranging failure condition is expressed as N+128<M<N+256, wherein M indicates the least significant 8 bits of a first frame number, wherein the least significant 8 bits of the first frame number are the frame number of the OFDMA frame where the mobile station sent the ranging code, wherein N indicates the least significant 8 bits of a second frame number, and wherein the least significant 8 bits of the second frame number are specified in the ranging response message's attributes.

4. The method of claim 1, wherein a ranging timer is set upon initially sending the ranging code to the base station, and wherein the ranging code is re-sent to the base station before expiration of the ranging timer.

5. The method of claim 1, wherein the ranging response message is received in a particular frame, and further comprising determining whether any additional ranging response messages have been received in the same frame before re-sending the ranging code to the base station.

6. The method of claim 1, wherein the mobile station is configured for operation in one or more wireless communication networks that supports one or more Institute of Electronic and Electrical Engineers (IEEE) 802.16 standards.

7. The method of claim 6, wherein IEEE 802.16e terminals and IEEE 802.16m terminals share the same ranging region.

8. The method of claim 7, wherein ranging codes are split into two different sets of ranging codes, a first set to be used by IEEE 802.16e terminals, and a second set to be used by IEEE 802.16m terminals.

9. The method of claim 8, wherein ranging attributes in the ranging response message are set to indicate whether the ranging response message is for a ranging code from the first set of ranging codes or the second set of ranging codes.

10. The method of claim 9, wherein the mobile station is configured for IEEE 802.16e, and further comprising determining whether the ranging attributes that are specified in the ranging response message correspond to a ranging code from the first set of ranging codes or the second set of ranging codes.

11. A mobile station configured for efficiently performing ranging in a wireless communication network, comprising:
 a processor;
 memory in electronic communication with the processor;
 instructions stored in the memory, the instructions being executable by the processor to:
  send a ranging code to a base station;
  receive a ranging response message from the base station;

determine whether a ranging failure condition is satisfied, wherein the ranging failure condition comprises a first frame number corresponding to the ranging code and to a first frame being lower than a second frame number corresponding to the ranging response message and to a second frame, wherein the first frame is transmitted earlier than the second frame, and wherein the ranging failure condition relates to something other than a duration of time; and
  re-send the ranging code to the base station if the ranging failure condition is satisfied.

12. The mobile station of claim 11, wherein the ranging failure condition is expressed as N−128<M<N, wherein M indicates the least significant 8 bits of a first frame number, wherein the least significant 8 bits of the first frame number are the frame number of the OFDMA frame where the mobile station sent the ranging code, wherein N indicates the least significant 8 bits of a second frame number, and wherein the least significant 8 bits of the second frame number are specified in the ranging response message's attributes.

13. The mobile station of claim 11, wherein the ranging failure condition is expressed as N+128<M<N+256, wherein M indicates the least significant 8 bits of a first frame number, wherein the least significant 8 bits of the first frame number are the frame number of the OFDMA frame where the mobile station sent the ranging code, wherein N indicates the least significant 8 bits of a second frame number, and wherein the least significant 8 bits of the second frame number are specified in the ranging response message's attributes.

14. The mobile station of claim 11, wherein a ranging timer is set upon initially sending the ranging code to the base station, and wherein the ranging code is re-sent to the base station before expiration of the ranging timer.

15. The mobile station of claim 11, wherein the ranging response message is received in a particular frame, and wherein the instructions are also executable to determine whether any additional ranging response messages have been received in the same frame before re-sending the ranging code to the base station.

16. The mobile station of claim 11, wherein the mobile station is configured for operation in one or more wireless communication network that supports one or more Institute of Electronic and Electrical Engineers (IEEE) 802.16 standards.

17. The mobile station of claim 16, wherein IEEE 802.16e terminals and IEEE 802.16m terminals share the same ranging region.

18. The mobile station of claim 17, wherein ranging codes are split into two different sets of ranging codes, a first set to be used by IEEE 802.16e terminals, and a second set to be used by IEEE 802.16m terminals.

19. The mobile station of claim 18, wherein ranging attributes in the ranging response message are set to indicate whether the ranging response message is for a ranging code from the first set of ranging codes or the second set of ranging codes.

20. The mobile station of claim 19, wherein the mobile station is configured for IEEE 802.16e, and wherein the instructions are also executable to determine whether the ranging attributes that are specified in the ranging response message correspond to a ranging code from the first set of ranging codes or the second set of ranging codes.

21. A mobile station configured for efficiently performing ranging in a wireless communication network, comprising:
 means for sending a ranging code to a base station;
 means for receiving a ranging response message from the base station;

means for determining whether a ranging failure condition is satisfied, wherein the ranging failure condition comprises a first frame number corresponding to the ranging code and to a first frame being lower than a second frame number corresponding to the ranging response message and to a second frame, wherein the first frame is transmitted earlier than the second frame, and wherein the ranging failure condition relates to something other than a duration of time; and means for re-sending the ranging code to the base station if the ranging failure condition is satisfied.

22. The mobile station of claim 21, wherein the ranging failure condition is expressed as N−128<M≤N, wherein M indicates the least significant 8 bits of a first frame number, wherein the least significant 8 bits of the first frame number are the frame number of the OFDMA frame where the mobile station sent the ranging code, wherein N indicates the least significant 8 bits of a second frame number, and wherein the least significant 8 bits of the second frame number are specified in the ranging response message's attributes.

23. The mobile station of claim 21, wherein the ranging failure condition is expressed as N+128<M≤N+256, wherein M indicates the least significant 8 bits of a first frame number, wherein the least significant 8 bits of the first frame number are the frame number of the OFDMA frame where the mobile station sent the ranging code, wherein N indicates the least significant 8 bits of a second frame number, and wherein the least significant 8 bits of the second frame number are specified in the ranging response message's attributes.

24. A computer-program product for efficiently performing ranging in a wireless communication network, the computer-program product comprising a computer-readable medium having instructions thereon, the instructions comprising:

code for sending a ranging code to a base station;

code for receiving a ranging response message from the base station;

code for determining whether a ranging failure condition is satisfied, wherein the ranging failure condition comprises a first frame number corresponding to the ranging code and to a first frame being lower than a second frame number corresponding to the ranging response message and to a second frame, wherein the first frame is transmitted earlier than the second frame, and wherein the ranging failure condition relates to something other than a duration of time; and code for re-sending the ranging code to the base station if the ranging failure condition is satisfied.

25. The computer-program product of claim 24, wherein the ranging failure condition is expressed as N−128<M≤N, wherein M indicates the least significant 8 bits of a first frame number, wherein the least significant 8 bits of the first frame number are the frame number of the OFDMA frame where the mobile station sent the ranging code, wherein N indicates the least significant 8 bits of a second frame number, and wherein the least significant 8 bits of the second frame number are specified in the ranging response message's attributes.

26. The computer-program product of claim 24, wherein the ranging failure condition is expressed as N+128<M≤N+256, wherein M indicates the least significant 8 bits of a first frame number, wherein the least significant 8 bits of the first frame number are the frame number of the OFDMA frame where the mobile station sent the ranging code, wherein N indicates the least significant 8 bits of a second frame number, and wherein the least significant 8 bits of the second frame number are specified in the ranging response message's attributes.

* * * * *